(12) United States Patent
Bruck et al.

(10) Patent No.: US 10,146,235 B2
(45) Date of Patent: Dec. 4, 2018

(54) VALVE DEVICE

(71) Applicant: HYDAC FLUIDTECHNIK GMBH, Sulzbach/Saar (DE)

(72) Inventors: Peter Bruck, Althornbach (DE); Frank Schulz, Blieskastel-Bierbach (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 186 days.

(21) Appl. No.: 14/912,180

(22) PCT Filed: Jul. 5, 2014

(86) PCT No.: PCT/EP2014/001853
§ 371 (c)(1),
(2) Date: Feb. 16, 2016

(87) PCT Pub. No.: WO2015/028108
PCT Pub. Date: Mar. 5, 2015

(65) Prior Publication Data
US 2016/0195879 A1    Jul. 7, 2016

(30) Foreign Application Priority Data

Aug. 30, 2013   (DE) .................. 10 2013 014 452

(51) Int. Cl.
*F16K 31/06*     (2006.01)
*G05D 16/20*     (2006.01)

(52) U.S. Cl.
CPC ..... *G05D 16/2013* (2013.01); *F16K 31/0613* (2013.01); *Y10T 137/8671* (2015.04);
(Continued)

(58) Field of Classification Search
CPC ............ G05D 16/2013; F16K 31/0613; Y10T 137/86622; Y10T 137/86702; Y10T 137/8671; Y10T 137/86694
(Continued)

(56) References Cited

U.S. PATENT DOCUMENTS 5,323,809 A * 6/1994 Tischer ............... F16K 31/0613
                                                          137/513.5
6,779,558 B1   8/2004 Bruck et al.
(Continued)

FOREIGN PATENT DOCUMENTS

DE      20 50 360       4/1971
DE      39 38 417       3/1991
(Continued)

OTHER PUBLICATIONS

International Search Report (ISR) dated Nov. 12, 2014 in International (PCT) Application No. PCT/EP2014/001853.

*Primary Examiner* — Kevin Murphy
*Assistant Examiner* — Kelsey Cary
(74) *Attorney, Agent, or Firm* — Wenderoth, Lind & Ponack, L.L.P.

(57) ABSTRACT

A proportional pressure regulating valve has a valve piston (12) longitudinally movable in a valve housing (10) and connecting a utility connection (A) to a pressure supply connection (P) or to a tank or return flow connection (T) dependent on the displacement position of the valve piston. The valve piston is actuated by an actuation magnet (48) that can be supplied with current. A control device (50) is between the valve piston (12) and the actuation magnet (48), and allows the valve piston (12) to become pressureless on the valve piston side (52) facing the actuation magnet (48). The valve piston (12) is displaced in the direction of the
(Continued)

actuation magnet (48) under the supply and/or utility connection pressure when the actuation magnet is not actuated.

14 Claims, 2 Drawing Sheets

(52) U.S. Cl.
CPC ............... *Y10T 137/86622* (2015.04); *Y10T 137/86694* (2015.04); *Y10T 137/86702* (2015.04)

(58) Field of Classification Search
USPC ............ 137/625.65, 625.68, 625.69, 625.67, 137/625.26
See application file for complete search history.

(56) References Cited

U.S. PATENT DOCUMENTS

| | | | | |
|---|---|---|---|---|
| 2004/0256012 | A1* | 12/2004 | Bruck | ............... G05D 16/2013 137/625.65 |
| 2006/0273270 | A1 | 12/2006 | Bill et al. | |
| 2007/0169826 | A1* | 7/2007 | Hillesheim | ........ G05D 16/2093 137/625.64 |
| 2012/0048398 | A1* | 3/2012 | Schudt | ............... F16K 31/0613 137/514 |

FOREIGN PATENT DOCUMENTS

| | | |
|---|---|---|
| DE | 103 08 910 | 9/2004 |
| DE | 10 2005 056 039 | 6/2007 |
| EP | 1 226 478 | 4/2005 |
| EP | 1 625 307 | 2/2008 |
| GB | 673378 | 6/1952 |

\* cited by examiner

VALVE DEVICE

FIELD OF THE INVENTION

The invention relates to a valve device, in particular, in the form of a proportional pressure regulating valve, having a valve piston guided in a longitudinally movable manner in a valve housing. The valve piston connects a utility connection to a pressure supply connection and to a tank connection or return flow connection depending on its movement position, and can be actuated by an actuating device, in particular, in the form of an energizable actuating magnet.

BACKGROUND OF THE INVENTION

Proportional pressure regulating valves are very frequently used in mobile work machines for electrohydraulic pilot control of directional control valves. Regularly, directly controlled proportional pressure regulating valves are sufficient for smaller work machines. In the case of large work machines or construction machines such as, excavators, the directional control valves of the working hydraulics reach piston diameters, in which a pilot control with directly controlled proportional pressure regulating valves is no longer practical. The large slide valves cause a pilot oil flow during rapid switching, which is no longer, which then exceeds the capacity of the small pilot valves.

For such applications, proportional pressure regulating valves with surface ratios are used. These valves have a pressure-active surface that is smaller than the piston diameter. Thus, the forces caused by the regulating pressure, which act against the magnet system, are significantly reduced. However, the large piston is able to allow a significantly larger volume flow to pass as compared to the directly controlled valve, and therefore, shorten significantly the switching times of the larger slide valves.

This principle of surface ratio has the great advantage, compared to a classical pilot-controlled proportional pressure regulating valve. There is no need for a permanent pilot oil flow. The leakage of such valves, in particular in the non-energized state, is extremely small. This characteristic has significant advantages in the case of an emergency supplying of the proportional valves with a pressure accumulator.

A valve representative of this kind according to the teaching of EP 1 625 307 B1, in particular, is in the form of a proportional seat valve or slide valve having a valve housing and at least three fluid connections extending through the valve housing. A main piston is guided in the valve housing, with a pilot piston effecting a pilot control. The pilot piston may be controlled by an energizable magnetic device. During an open pilot control, fluid from one of the two connectors controllable by the main piston reaches the third connector, controlled by the pilot piston, via a cross-sectional narrowing in the main piston and the pilot control. As a result of the corresponding pressure drop, the main piston in each case reaches a control position, controlling both fluid connections with regard to fluid amount. A compression spring is disposed between the main piston and the pilot piston. The piston stroke of the main piston is proportional to the magnetic flow of the magnet device during open pilot control. The compression spring engages in a recess of the main piston, into which recess the cross-sectional narrowing opens in the form of an aperture.

Because, in the known solution, a contact piece is disposed on the free end of the compression spring assigned to the pilot piston, which is connected to the free end of the pilot piston by a contact ball, an improved interaction between pilot piston and main piston is created. In particular, a largely obstruction-free and, therefore, functionally reliable operation is ensured.

Another valve, in particular, a pressure regulating valve, is known from EP 1 226 478 B1. This valve has a valve housing with at least one pump connection, utility connection and tank connection. A valve piston, which can be controlled by a magnet armature, is guided inside the valve housing. The valve is provided with a hydraulic damping device, which has a damping chamber that is fluidically connected via a choke with a choke point to the utility connection. The pump connection or the tank connection is selectively joined to the utility connection via a connecting line, depending on the position of the valve piston.

Because, in this known solution, the choke point is at least partially formed by an annular gap, which is formed between an annular disc and sections of the valve housing which surround the annular disc, because the annular disc is crimped at points with the valve housing, and because the annular gap is interrupted at the connection points as well as by the front-end contact of the annular disc with the interior of the valve housing, the fluid stored in the damping chamber is displaced via the choke in the direction of the utility connection in the event of a deflection of the valve piston in the direction of the choke caused by the magnetic force of the gap magnet. The displacement volume flow via the choke generates a local pressure build-up.

A force, which is directed against the deflecting force of the valve piston and exerts a damping effect on the entire valve piston, may be determined on the pressure-active surface that defines the choke point. When retracting the valve piston in the opposite direction, this fluid volume coming from the utility connection is then forced to flow back into the now expanding damping chamber again via a defined choke, and results in a damping of the vibrations occurring. An improved control behavior then results for the known valve, which also enhances the functional reliability.

In spite of these advantageous feature configurations in the prior art relating to the valves described above, in particular, in specific applications, the frictional forces of the main piston may no longer be compensated for by the surface ratio.

The application, in which the valves must be maximally energized for very long periods and the primary pressure is less than the maximum possible regulating pressure (undersupply), must be especially critically evaluated. If, in such case, dirt particles end up in the operating clearance of the respective valve piston, the result is a significant increase in friction. If, after this holding period at high energization, the flow is reduced again, a "valve blockage" may then result, because under certain circumstances the relatively small spring force of the return spring is no longer sufficient for returning the piston. This case must be classified as critical to safety, because the main slider controlled by the proportional pressure regulated valve can then no longer be switched back or returned to the neutral position. Thus, the consumer can no longer be stopped.

SUMMARY OF THE INVENTION

An object of the invention is to increase significantly the return reliability of a surface-ratioed proportional pressure regulating valve, without negatively affecting the system-related advantages of the valve described above.

That object is basically achieved by a valve device having a control device present between the valve piston and the actuating device, which control device allows the valve piston to be rendered pressureless on the valve piston side facing the actuating device (48) in the direction of the tank connection or return flow connection. The valve piston is then displaced in the direction of the actuating device under the supply pressure and/or utility connection pressure. That can be actuated during operation, when the actuating device is preferably not actuated. The valve according to the invention functions during normal operation exactly as a conventional surface-ratioed proportional pressure regulating valve. In this case, the pressure applied on both front ends of the piston is equally great and corresponds to the regulating pressure. The control device, which is preferably designed as a control part in the manner of a measuring pin, is connected on its one side to the regulating pressure and on its other opposite side to the tank pressure. Thus, the control part operates with respect to the measuring pin counter to the magnetic force, depending on the regulating pressure.

In this conventional valve function, the hydraulic consumer attached to the utility connection is supplied with hydraulic fluid through the connection to the pressure supply connection or pump connection.

If the actuating device in the form of the actuating magnet is switched off, and should the main piston or valve piston become stuck in its opened position, i.e., in the normal supply function described above, then the same pressure, which corresponds to the operating pressure at the utility connection, is initially set at both the main piston or valve piston side, depending on the valve. In such case, the magnetic force equals zero when the coil is switched off, and the control device, designed preferably in the form of a measuring pin-shaped control part, is then forced by operating pressure at the utility connection in the direction of the actuating device. Due to its preferred geometry, the control device is then able to establish a connection between the utility connection and the tank connection or return flow connection. As a result, a chamber region between the main piston or valve piston and the control device is lowered to tank pressure. A piston aperture of the valve piston, designed in the strict sense as a damping aperture, now becomes a pilot aperture. A pilot oil flow then forms via this aperture as a result, which flow results in a sharp pressure drop at the pilot aperture. Thus, the pressure drops close to tank pressure on the control side of the main piston or valve piston facing the actuating device. In such case, the front side of the main piston facing the utility connection then becomes the only pressure-active surface, and an extremely powerful force forms on the valve piston or main piston. That force is 20 times more powerful than that in the prior art, which force then frees the main piston from its stuck open position. In this regard, a fail-safe function is achieved with the solution of the invention, which properly breaks or pulls the valve piston or main piston out of its potentially stuck opening position.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are not to scale.

DETAILED DESCRIPTION OF THE INVENTION

Figure 1:
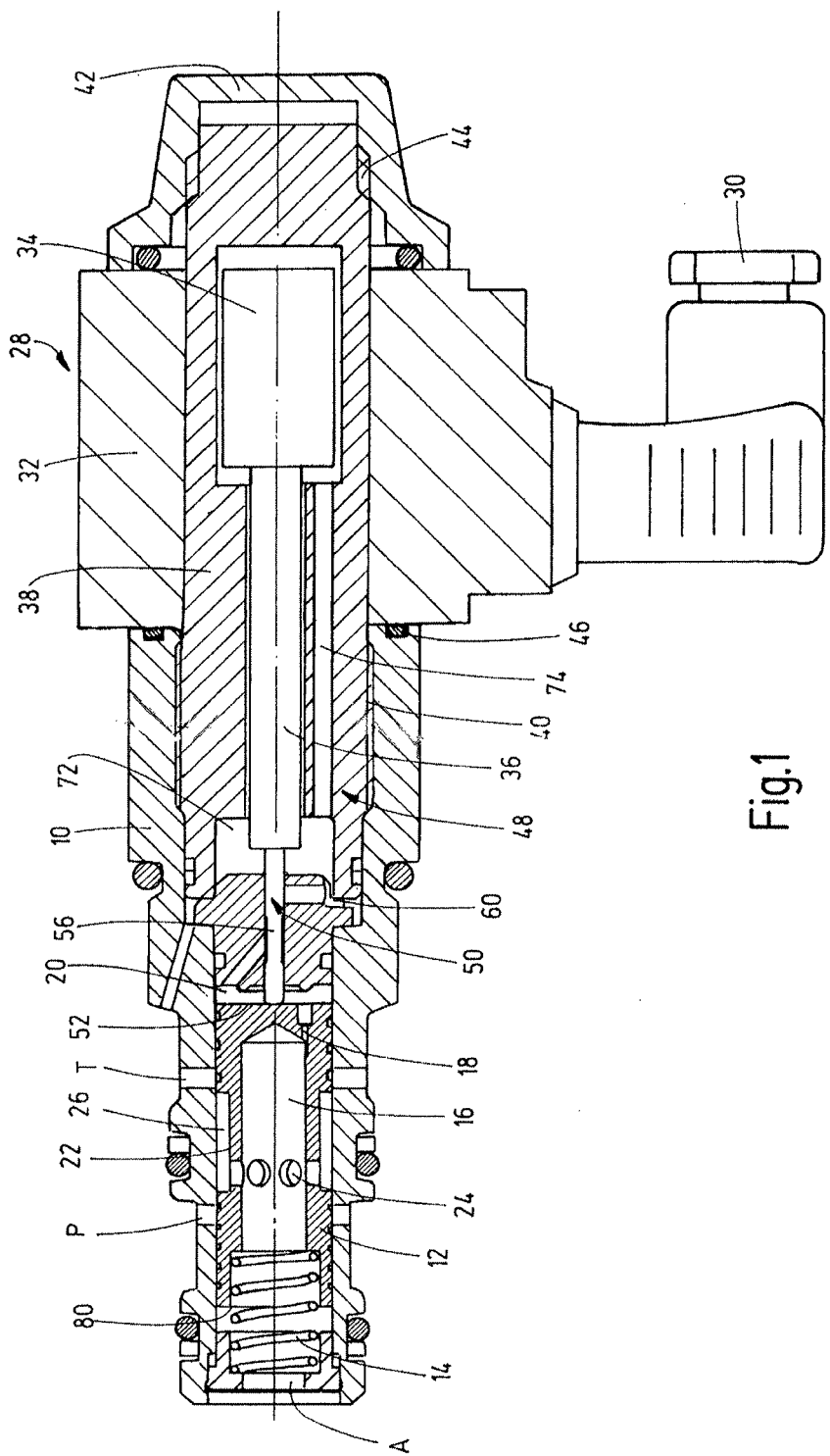
FIG. 1 is a side elevational view in section of a valve device according to an exemplary embodiment of the invention.

The valve shown in FIG. 1 has a valve housing 10, which is designed as a type of screw-in cartridge, technically also referred to as a cartridge valve, such that the valve can be screwed or inserted into a valve block (not depicted) via exterior threads (not further depicted) or via another fixing option for functionally reliable use. The valve housing 10 has a utility connection A on its one free front end, a pressure supply connection P, and a tank connection or return flow connection T. The pressure supply connection and the tank or return connection are introduced or extend radially in the valve housing 10, while maintaining a predefinable axial distance between them. The connections A, P and T of this type then correspond to corresponding fluidic feed line connections in the valve block not further depicted, into which the valve and its valve housing 10 are inserted.

A main piston or valve piston 12 is disposed such that it is movable in the longitudinal direction inside the valve housing 10. In its position depicted in FIGS. 1 and 2, valve piston 12 closes the connections A, P and T off from one another, so that no fluid flow can take place between the aforementioned connections. In addition, the main piston or valve piston 12, as seen in FIG. 1, is braced on its left side against a return spring 14, designed preferably as a compression spring. The main piston or valve piston has a hollow channel 16, which is designed as a type of blind hole and which opens on its one free front end into the utility connection A and merges on its other free front end with an aperture 18 or choke point. Aperture 18 establishes a fluidic connection between the hollow channel 16 and a hollow chamber space functioning as pressure chamber 20. Pressure chamber 20 receives differing volumes as a function of the movement position of the main piston or valve piston 12. As seen in FIG. 1, pressure chamber 20 assumes a volume close to the value zero in the extreme right movement position of the main piston or valve piston 12.

In addition, the main piston or valve piston 12 has a reduced diameter 22 on its outer circumferential side according to the illustration in FIG. 1. The axial length of reduced diameter 22, as seen in the movement direction of the main piston or valve piston 12, is smaller than the distance from pressure supply connection P to tank connection or return flow connection T. In addition, a row of holes 24 extends radially through the wall of the main piston or valve piston 12 in the region of the diameter reduction 22 to establish a fluidic connection or fluid communication between the utility connection A and an annular chamber 26. Chamber 26 is delimited on the one hand by the inner wall of the valve housing 10 and on the other hand by the outer wall of the main piston or valve piston 12 in the region of the diameter reduction 22. If the main piston or valve piston 12 moves a predefinable distance to the left, in the direction of FIG. 1, the utility connection A can then be connected in a pressurized manner to or in fluid communication with the pressure supply connection P via the annular chamber 26 and the row of holes 24, as well as the hollow channel 16. In the case of a movement direction of the main piston or valve piston 12 largely to the right, the resultant pressure supply is then inhibited and the utility connection A is again fluidically connected or in fluid communication via the hollow channel 16, the row of holes 24, as well as the annular chamber 26, to the tank connection or return flow connection T. Like the row of holes 24, both the pressure supply connection P as well as the tank connection or return flow connection T may be formed by a row of holes extending radially continuously into the valve housing 10, as is also indicated by FIG. 1.

A magnet system or actuator 28 includes a cable socket 30 as well as a magnet armature 34, guided and actuatable inside a magnetic coil 32 (not further depicted). Magnet system 28 is used to electrically actuate the main piston or valve piston 12. A plunger-shaped actuating part 36 which, as seen in FIG. 1, is connected on its right end to the magnet armature 34, is used to actuate the piston 12. The magnet armature 34 is guided in a longitudinally movable manner in a coil tube system 38 known per se. The front end of the coil tube system 38 is screwed in a conventional manner via threads 40 into the inner circumferential side of the valve housing 10. The magnetic coil 32 with its housing parts is slid onto the outer circumference of the coil tube system 38. A cover part 42 may be screwed on to the one free end of the coil tube system 38 via additional threads 44. Coil tube system 38 is mounted on the right free front end of the valve housing 10, and correspondingly sealed at this point via an O-ring seal 46. Insofar as annular recesses are depicted in the valve design according to FIG. 1, such recesses are provided with corresponding sealing rings and/or annular guide bands to obtain a conventional seal in terms of valve technology achieve a conventional technical valve seal. Since such sealing systems in valve technology form part of the prior art, they will not be discussed in further detail below. The magnet system 28 with the magnet armature 34 and the actuating element 36 constitute an actuating device 48 conventional in the prior art for controlling the main piston or valve piston 12.

According to the embodiment of the valve device according to the invention, a control device or control 50 is present between the main piston or valve piston 12 and the actuating device or actuator 48. Control device 50 allows the main piston or valve piston 12 to be rendered pressureless on the piston side 52 facing the actuating device 48 in the direction of the tank connection or return flow connection T. The main piston or valve piston 12 then moves in the direction of the actuating device 48 under the supply pressure and/or utility connection pressure, which pressures can be actuated during operation, when the actuating device is not actuated. In the present exemplary embodiment, the actuating device 48 is designed as a pressure-operated actuating magnet 28, which moves from its energized middle position further to the left, in the direction of FIG. 1, when the magnetic coil 32 is energized via the cable socket 30, until the pressure supply connection P is fluidically connected to the utility connection A via the row of holes 24. If the magnet system 28 remains de-energized, the main piston or valve piston 12 is moved via the return spring 14 to its maximum possible right movement position (not depicted) and, in the process, moved via the actuating element 36 of the magnet armature 34, as seen in the viewing direction of FIG. 1, from its functional position into its maximum possible right end position (not depicted) inside the coil tube system 38.

Figure 2:
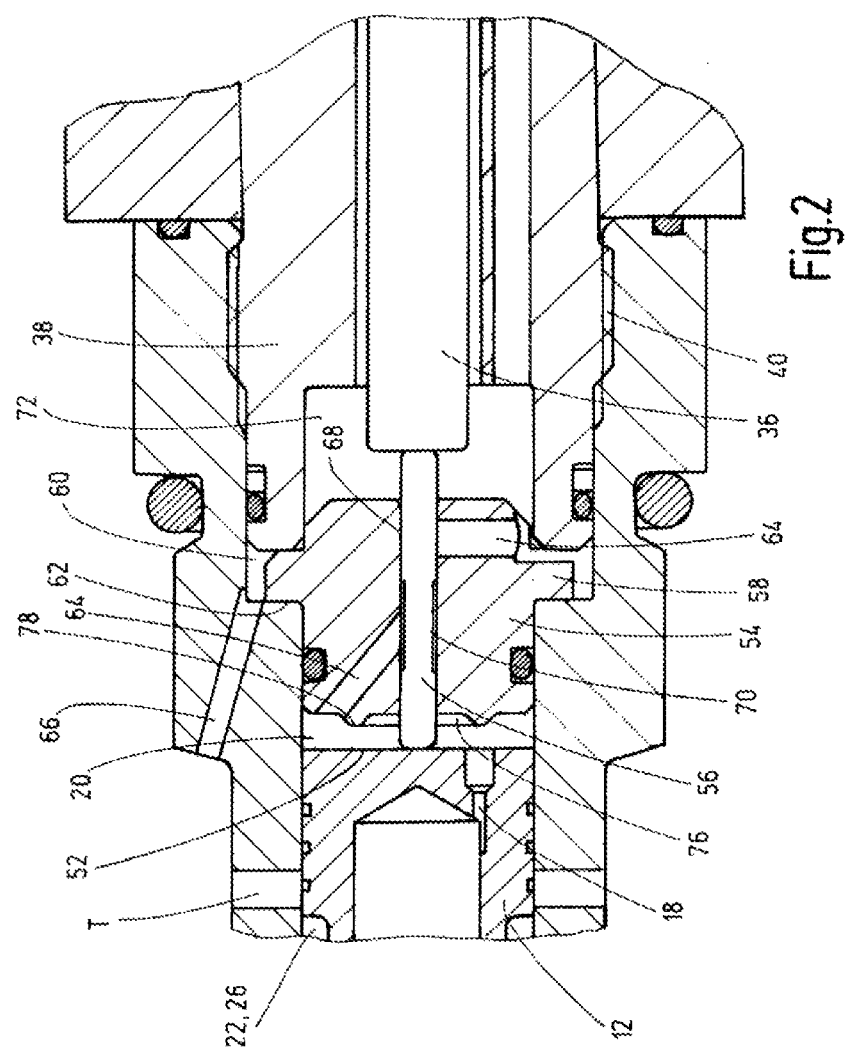
FIG. 2 is an enlarged side elevational view in section of a portion of the valve device of FIG. 1.

As shown, in particular in FIG. 2, the control device 50 includes a guide part 54 permanently fixed inside the valve housing 10 as well as to the actuating device 48. A control part 56 is guided in a longitudinally movable manner in guide part 54. The guide part 54 is designed as a type of guide bushing and is disposed with a flange-shaped widening 58 at the edge in a front side limiting gap 60 between an annular widening 62 of the valve housing 10 and the free front end of the coil tube system 38. The control part 56 is designed as a type of piston-shaped measuring pin, which extends completely through a middle recess of the guide part 54. The control part 56 with its one free end is in contact with the piston side 52 of the main piston or valve piston 12 facing the actuating device 48 with its one free end and in contact with the movable actuating part 36 of the actuating device 48 with its other free end.

As further shown in FIG. 2, the guide part 54 includes a fluidic channel 64. One or a first free end of channel 64 opens into the previously mentioned pressure chamber 20. The other or second end of channel 64 is fluidically permanently connected to the tank connection or return flow connection T. For this connection to the tank or return flow connection, an angular channel 66 extending inside the valve housing 10 opens into the previously introduced limiting gap 60, and at its other end, the angular channel 66 is connected via a fluid connection, not further depicted, inside the valve block, not depicted, to the tank connection or return flow connection T. While the one end portion of channel 64 also extends angularly inside the guide part 54, the other portion of channel end 64 opens into a radial cross-bar. One free outside end of the other end of channel 64 opens into the limiting gap 60. The other inside free end of the other end portion of channel 64 opens into the channel-shaped center passage 68 for the measuring pin-shaped control part 56. The pin-shaped control part 56 includes an additional recess 70 in its middle region formed by a diameter reduction in the control part 56. The axial length of recess 70 is selected such that, when the control pin 56, as seen in FIG. 2, moves from its left position shown to one of the movement positions situated further to the right, a fluid passage is formed via the channel-shaped recess 70 between the left and the right end of the channel 64 via the center passage 68 in the guide part 54. With this active movement position of the control part 56, a pressurized and media-guiding connection is established between the pressure chamber 20, as well as via the channels 64 and 66 to the tank connection or return flow connection T, so that, in this respect, the pressure chamber 20 is kept pressureless.

As is also indicated by the figures, the one free end of the rod-shaped actuating part 36 leads to an additional hollow chamber 72 next to the pressure chamber 20. Hollow chamber 72 is kept pressureless to the greatest extent possible via the limiting gap 60 leading to the tank connection or return flow connection T. To be able to ensure a frictionless moving operation for the magnet armature 34, a pressure compensation channel 74 is disposed inside the coil tube system 38. One free end of channel 74 opens into the additional hollow chamber 72. The other end of channel 74 opens into the receiving space for the magnet armature 34 inside the coil tube system 38. Insofar as the measuring pin-shaped control part 56 is in contact with the free front end of the rod-shaped actuating part 36, the resultant contact takes place inside the additional hollow chamber 72, specifically, in every movement position of control part 56 and actuating part 36. As indicated, in particular, by the illustration according to FIG. 2, the forward front end of the guide part 54, facing the one piston side 52 of the main piston or valve piston 12, is provided with an annular return or recess 76, into which the control part 56 is able to slip back, should the main piston or valve piston 12 come into contact with the protruding edge 78 of the guide part 54. Edge 78 surrounds the return 76 recessed in the guide part 54.

The functional operation of the valve device described above will now be explained in greater detail below. During normal operation, the valve according to the invention functions precisely like a conventional surface-ratioed proportional pressure regulating valve. The magnet system 28 is appropriately energized, and the main piston or valve piston 12 is in a left movement position, in which a fluidic connection is formed between the pressure supply connection P and the utility connection A. The tank connection or return flow connection T in this case is closed off by the main piston or valve piston 12. In this operational case, the pressure on both front sides 52, 80 of the main piston or valve piston 12 is equally great and corresponds to the regulating pressure. The measuring pin-shaped control part 56, as seen in the figures, is then connected on the left side to the regulating pressure and on the right side to the tank pressure, so that the controlling for the control part 56 takes place counter to the magnetic force of the magnet system 28 via the rod-shaped actuating part 36 as a function of the regulating pressure.

If the operating clearance between the outer circumferential side of the main piston or valve piston 12 and the passage interior wall of the valve housing 10 with which it may be associated, should become impaired due to contaminants accumulated between the pressure supply connection P and the utility connection A, the piston 12 may become stuck in its opened position. Again, the same pressure initially exists on both main piston sides 52 and 80, which corresponds to the operating pressure at the utility connection A. If the magnet system 28 is no longer energized, i.e., the magnet system is switched off, the return spring 14 should reset the piston 12 by itself, in order, for example, to be able to establish a fluidic connection between the utility connection A and the tank connection or return flow connection T in the valve housing 10. Because of the stuck main piston or valve piston 12, however, such a resetting is no longer possible.

At this point, the solution according to the invention comes into play, in that the measuring pin-shaped control part 56, as seen in the figures, is now forced to the right by operating pressure at the utility connection A. Due to its demonstrated geometry, in particular including its channel-shaped recess 70, it then opens in this right movement position a connection between the pressure chamber 20 and the tank connection or return flow connection T via the channel 64. Thus, the hollow chamber-shaped pressure chamber 20 between the main piston or valve piston 12, as well as the measuring pin-shaped control part 56 can be lowered to tank pressure. The actual piston aperture acting as a damping aperture now becomes a pilot aperture 18. In the functional case described, a pilot oil flow is then guided past this aperture 18, coming from the hollow channel 16 of the valve piston 12, resulting in a sharp pressure drop at the hollow channel 16, with the consequence that on the right front side 52 of the main piston or valve piston 12 the pressure in the chamber 20 drops nearly to tank pressure. In this case, the other free front side 80 of the main piston or valve piston 12 becomes the sole pressure-active surface. An extremely powerful force then arises, which in any case, frees the main piston or valve piston 12 from its described stuck position by breaking it away. After such breaking away, the valve can again operate in the conventionally described manner.

Two critical load conditions in particular are demonstrated in practice, for which the valve device according to the invention is particularly relevant, and can significantly increase the functional reliability of the valve.

The one case is when the valve is operated in saturation, in which the supply pressure is consistently greater than the maximum possible regulating pressure. The valve then switches through in the case of maximal energizing up to the travel stop. If this maximum energizing is maintained for a longer period of time, dirt particulates can encroach in the operating clearance between piston 12 and the inner wall of the valve housing with which it may be assigned, and to increase the friction for the piston 12. If the valve is subsequently switched off again, the piston 12 may become stuck, because the relatively minimal spring force of the energy accumulator 14 is unable to overcome the undesired friction arising in the fluid flow as a result of the dirt particles. In this case, the measuring pin-shaped control part 56 withdraws and the resultant pilot oil flow causes the pressure difference at the piston 12 and pulls that piston from its stuck position.

In contrast, there are also applications of a different order, in which the proportional valves are required to maintain a specific regulating pressure constant over a longer period of time. In this case, the supply pressure may fall below the regulating pressure for a certain time period and then rise above it, without changing the energization of the proportional valve. Here, too, the valve again goes to travel stop in the event of an undersupply. If the system pressure again rises above the regulating pressure, the proportional valve must then return by itself to the regulating position, so that the regulating pressure, in the event of the described sticking of the piston, does not uncontrollably follow the primary pressure.

In this case as well, the same effect again acts thereon, and the measuring pin 56 withdraws, because the regulating pressure becomes greater than the preset pressure and, thus, the pin 56 can be displaced against the magnetic force and its fail-safe function started.

Thus, with the valve device according to the invention, "valve stick" can be presented in the enabled state of an electromagnetically actuatable valve. Due to the fact that in most cases the valves control slide valves, which stop the movement of the actuators (=the hydraulic consumer connected at the utility port A) in the pressureless state of the control valves, a sticking of the control valves in the enabled state results in uncontrolled movements of these actuators. This circumstance is effectively prevented with the valve device according to the invention.

While one embodiment has been chosen to illustrate the invention, it will be understood by those skilled in the art that various changes and modifications can be made therein without departing from the scope of the invention as defined in the claims.

The invention claimed is:

1. A valve device, comprising:
a valve housing having a utility connection, a pressure supply connection and a tank or return connection;
a valve piston guided being longitudinal movable in said valve housing to selectively connect said utility connection to said pressure supply connection and said tank or return connection depending on movement positions of said valve piston;
an actuator controlling movement of said valve piston in said valve housing; and
a control being located between said valve piston and said actuator and allowing reduction of pressure on an actuator end of said valve piston facing said actuator such that said valve piston will move in a direction of said actuator by fluid pressure at at least one of said pressure supply connection or said utility connection if said actuator is inactive, said control including a guide part permanently fixed in at least one of said valve housing or on said actuator and including a control part longitudinally movable in said guide part, said guide part having a fluidic channel opening at a first end into a pressure chamber between said valve piston and said guide part and being connected at a second end to said tank or return connection, said control part closing said fluidic channel between said first and second ends thereof in a movement direction of said control part toward said valve piston and opening said fluidic channel between said first and second ends thereof in a movement direction away from said valve piston.

2. A valve device according to claim 1 wherein
the valve device is a proportional pressure regulating valve.

3. A valve device according to claim 1 wherein
said actuator is an energizable actuating magnet.

4. A valve device according to claim 1 wherein
said control part comprises a first free end engageable with said actuator end of said valve piston and a second free end engageable with a moveable actuating part of said actuator.

5. A valve device according to claim 1 wherein
said valve piston comprises a hollow channel therein opening on an axial end of said valve piston opposite said actuator end and into said utility connection and having an aperture in said actuator end of said valve piston providing permanent fluid communication between said hollow channel of said valve piston and a pressure chamber between said valve piston and said guide part.

6. A valve device according to claim 5 wherein
said hollow channel comprises a blind bore.

7. A valve device according to claim 5 wherein
said aperture in said actuator end of said valve piston comprises a choke point.

8. A valve device according to claim 1 wherein
said valve piston comprises a reduced diameter portion on an outer circumferential side of said valve piston, said reduced diameter portion having an axial length smaller than an axial distance between said pressure supply connection and said tank or return connection.

9. A valve device according to claim 1 wherein
said utility connection extends through a front axial end of said valve housing; and
said pressure supply connection and said tank or return connection extend radially through said valve housing.

10. A valve device according to claim 1 wherein
an energy accumulator is between a free front end of said valve piston facing said utility port and said valve housing adjacent said utility port.

11. A valve device according to claim 10 wherein
said energy accumulator is a compression spring.

12. A valve device according to claim 1 wherein
said valve housing comprises an angular channel connecting said fluidic channel in said guide part to said tank or return connection in fluid communication.

13. A valve device according to claim 1 wherein
fluid pressure at said utility connection and said pressure supply connection acts on a free front end and said actuator end of said valve piston when said actuator controls movement of said valve piston.

14. A valve device according to claim 1 wherein
said control reduces pressure on said actuator end of said valve piston by connecting said actuator end to said tank or return connection, while an opposite end of said valve piston remains exposed to pressure at at least one of said utility connection or pressure supply connection.

* * * * *